Figure 4:
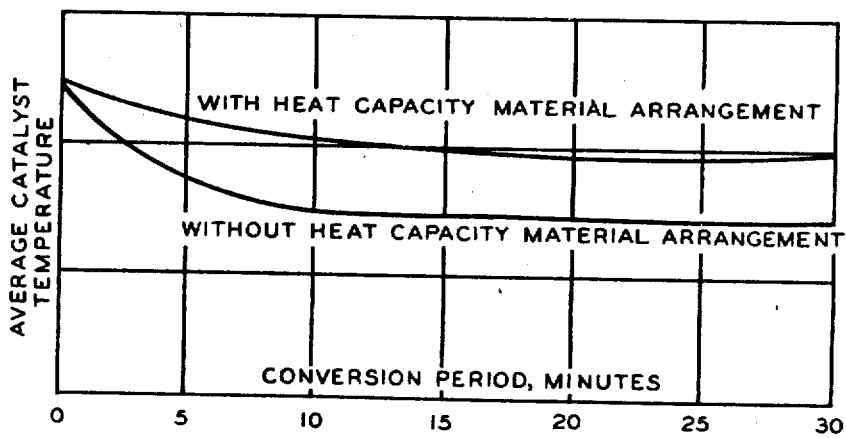

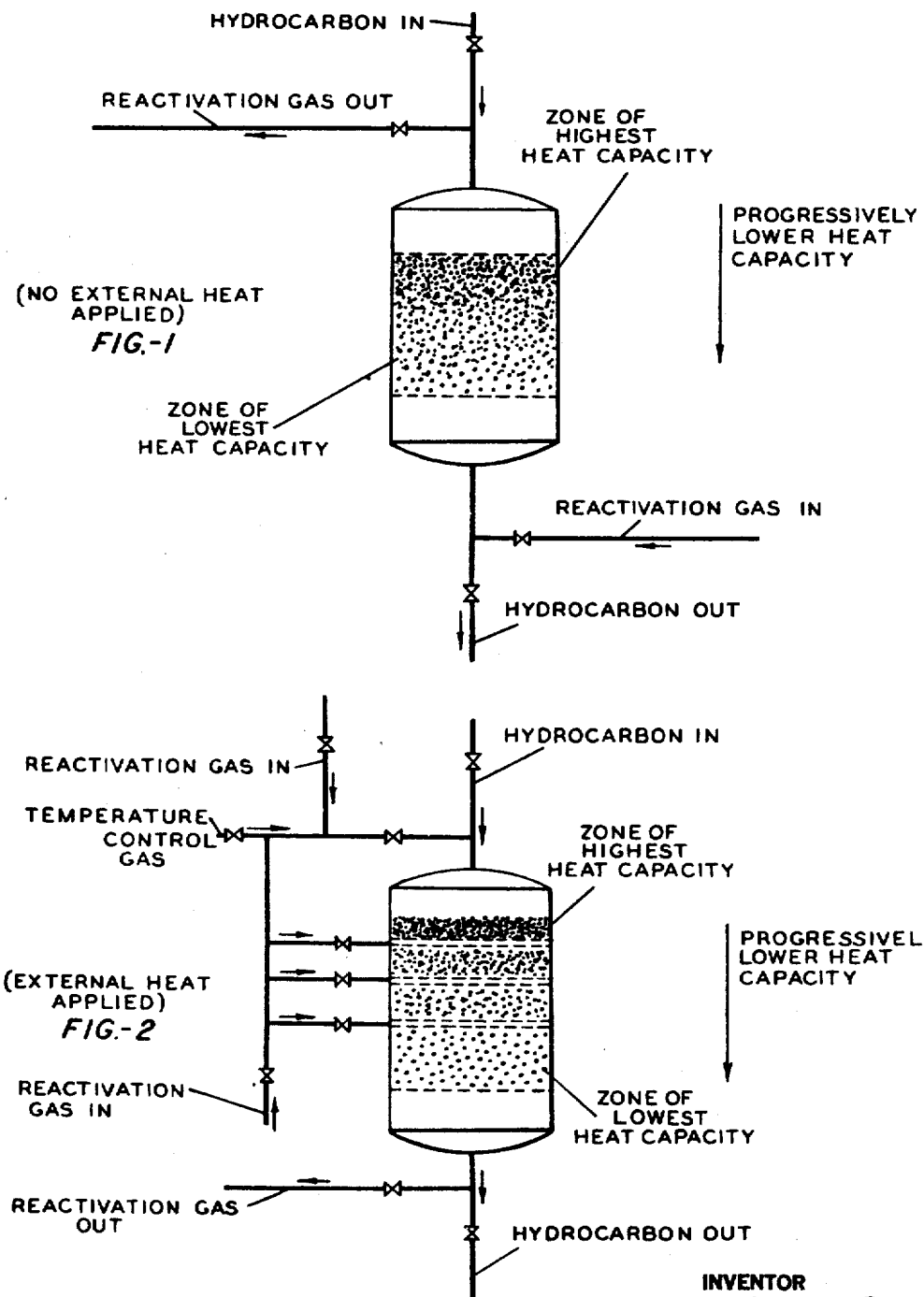

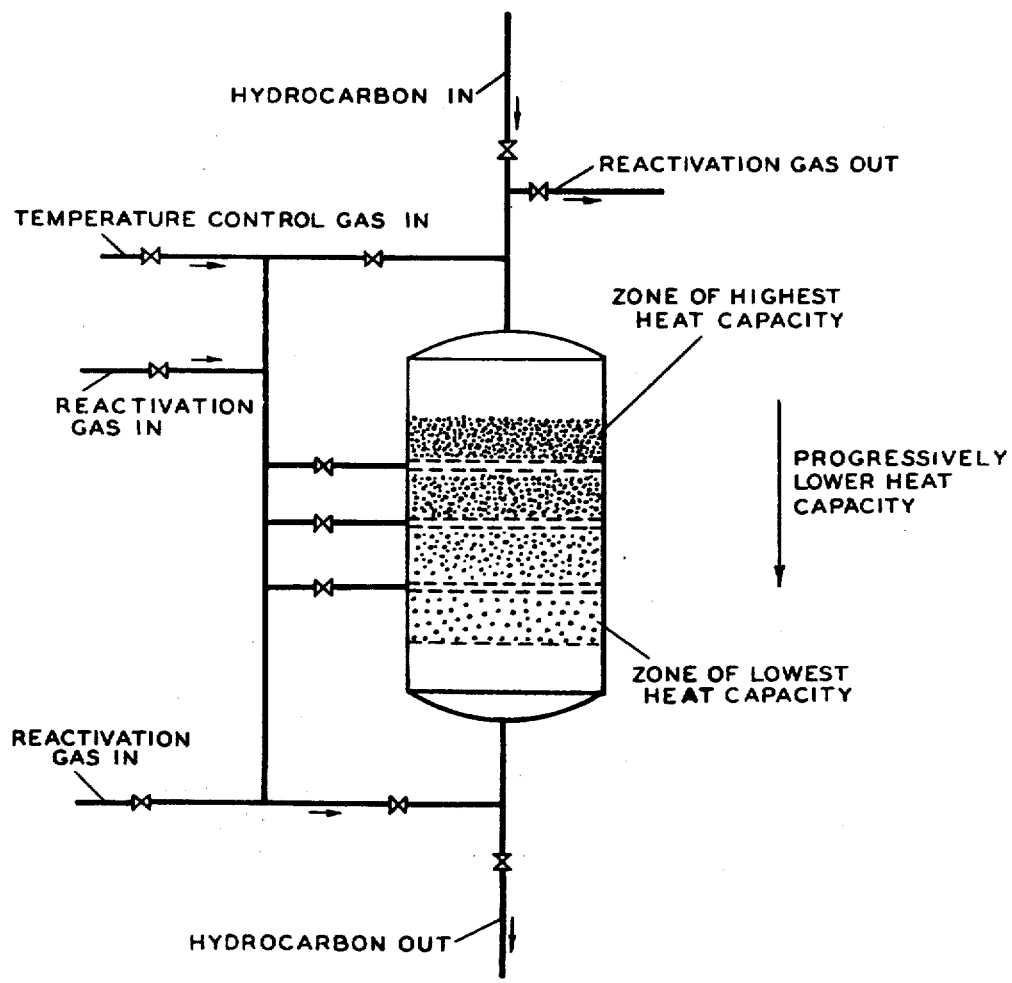

GAS OIL CRACKING WITH NO SUPPLEMENTAL HEAT APPLIED TO CATALYST

DEHYDROGENATION WITH SUPPLEMENTAL HEAT APPLIED TO CATALYST

Patented July 15, 1947

2,423,907

UNITED STATES PATENT OFFICE 2,423,907

CATALYTIC CONVERSION OF HYDROCARBONS

Walter A. Schulze, Bartlesville, Okla., assignor to Phillips Petroleum Company, a corporation of Delaware Application December 12, 1944, Serial No. 567,855

6 Claims. (Cl. 196—52)

This invention relates to a process of effecting chemical reactions in the presence of solid contact masses. More specifically this invention relates to the utilization of a catalyst bed as a heat capacitor in processes involving endothermic or exothermic reactions. In one aspect this invention relates to the catalytic conversion of hydrocarbons effected in the presence of solid contact masses. Still more specifically the invention relates to the arrangement and control of the heat capacity of the contact masses in order to supply or remove heat of reaction.

In hydrocarbon conversions such as dehydrogenation, cracking, reforming, and the like, carried out in the presence of solid catalysts disposed in stationary beds, major operating problems are introduced by the poor heat capacity of the catalyst bed and the necessity for supply and removal of relatively large amounts of heat during the conversion and reactivation periods. In many cases the conversion period is ordinarily characterized by endothermic chemical reactions which absorb heat with the consequent lowering of reactant and catalyst temperatures and decreased conversion. Then, when the catalyst becomes deactivated through carbonaceous deposits formed during the conversion and it is necessary to restore its activity by combustion of the deposits in the regeneration of the catalyst, the highly exothermic combustion necessitates control and removal of the heat generated in order to avoid deterioration of the catalyst by overheating, etc.

Various expedients have been suggested in the catalytic conversion of hydrocarbons for providing the necessary heat transfer, such as arranging the catalyst in tubes of narrow cross-section which are suspended in a heating or cooling medium, positioning indirect heat exchange members within a catalyst bed, and other similar methods. Obviously, the greatest efficiency would be obtained by the use of the catalyst bed itself as a heat reservoir or capacitor by proper control of its heat capacity. In this manner, the heat generated during exothermic reactivation of the catalyst may be retained by the catalyst bed and released during the conversion of the hydrocarbons to supply a substantial portion of the endothermic heat of conversion.

An object of the present invention is the use of a heat capacity material in effecting chemical reactions in such a manner as to supply or remove the heat of reaction.

A further object of the invention is the improvement of process efficiency in endothermic and exothermic hydrocarbon conversions.

Another object of the invention is the adjustment of the heat capacity of specific portions of the catalyst bed in the conversion of hydrocarbons to correspond directly with the quantity of heat potentially transferrable to the bed during exothermic catalyst reactivation.

Another object of the invention is the achievement of greater flexibility and temperature control during hydrocarbon conversion and catalyst reactivation.

Still another object of the invention is the efficient retention of heat generated in exothermic catalyst reactivation for use during endothermic hydrocarbon conversion.

Other objects and advantages will become obvious from disclosure of the invention contained hereafter.

In the present process, a novel use of the heat capacity characteristics of a catalyst and high heat capacity material has been discovered which provides for the arrangement of the catalyst and said heat capacity material to form the contact mass of a catalyst bed in such a manner as to supply or remove the heat of reaction for processes of an exothermic or endothermic nature. In the application of this invention to an endothermic hydrocarbon conversion process, the contact mass of the catalyst bed comprises a material of high heat capacity and a catalyst of relatively less heat capacity. The catalyst and high heat capacity material are so arranged that the low heat capacity catalyst is present in the maximum quantity at the position in the catalyst bed where endothermic heat requirements are the smallest; and in the other portion of the catalyst bed where the endothermic heat requirements are the greatest, the low heat capacity catalyst is present in the minimum amount having been replaced with the substance of relatively high heat capacity. This arrangement places the relatively high heat capacity zone at the position in the catalyst bed where the greatest amount of heat will be required by the endothermic conversion reactions. As a result, by previously supplying heat to this high heat capacity zone the heat thus retained is subsequently transferred to the endothermic reaction as required. In normal practice heat may be acquired by the high heat capacity material of the catalyst bed during the exothermic reactivation of the catalyst therein. This arrangement of a catalyst bed of gradational heat capacity is applicable to exothermic and endothermic chemical reaction in general, and is especially applicable to endothermic catalytic conversions followed by exothermic reactivation of the catalyst with or without means for supplementary heat exchange in the catalyst bed.

Essentially, then, the present invention comprises the use of a catalytically active material of low heat capacity and another material of high heat capacity which may or may not be catalytically active, in such manner as to provide close control of the heat requirements of exothermic and endothermic processes. Accordingly, the ratio of the low heat capacity catalytically active material to high heat capacity material is determined by the heat requirements of the various zones of the catalyst bed and is not determined by a quantity of catalytically active material necessary in any location of the catalyst bed to maintain the conversion rate by such presence per se. In other words, the rate of the reaction and extent of conversion is maintained by controlling the temperature of the reactants themselves through the addition of heat in the required amounts at the appropriate location within the catalyst bed rather than by controlling the concentration of catalyst itself.

The drawing of Figure 1 shows a catalyst bed in a chamber for a hydrocarbon conversion process fitted for the flow of pre-heated hydrocarbon fluid in an endothermic conversion period and reactivation gas in an exothermic catalyst reactivation period. The contact mass of the bed is prepared by admixing in the preferred predetermined proportions (A) material having suitable catalytic activity for the hydrocarbon conversion, and (B) a substance which may or may not be of substantially inferior activity in the promotion of the hydrocarbon conversion but chosen primarily to provide high heat capacity. The proportions of the mixture are such that the resultant catalyst bed has a high heat capacity in the hydrocarbon inlet section and a relatively lower heat capacity in the hydrocarbon outlet section. This arrangement is achieved by incorporation of decreasing proportions of the substance having low activity and high heat capacity in successive increments or sections of the bed, measured in the direction of hydrocarbon flow. The catalytic activity of the bed (defined in terms of concentration of active catalyst), may increase somewhat with the successive increments or sections of the bed in the direction of hydrocarbon flow. When heat is supplied to the catalyst bed arranged in this manner and is subsequently released to substantially fulfill heat requirements of the endothermic reactions, the largest amount of heat is available at the inlet where the most heat is required resulting in a higher average and more uniform temperature throughout the catalyst bed. The reason the heat requirements are greatest at the inlet and progressively less in the direction of hydrocarbon flow is probably because the endothermic reactions take place to the greatest extent and with the maximum rate at the inlet to the catalyst bed where the temperature and concentration of reactants are highest, and decrease in extent and rate as the temperature and concentration of reactants decrease as the reactants progress through the catalyst bed.

A convenient and practical method of arranging the catalyst bed in decreasing proportions of heat capacity material is by packing the catalyst bed in successive layers which are in themselves of constant proportions of catalyst and heat capacity material but have different proportions of catalyst and heat capacity material from the succeeding layer. The number of increments or layers of fixed concentration so prepared is not limited and may either be a very small number or a very large number of layers. By preparing a sufficient number of increments of small percentage variation, a catalyst bed of very gradual and uniform gradation can be obtained; as one extreme, one hundred and one increments would cover the entire composition range in steps of one per cent. The increments may be disposed in separate chambers arranged suitably in series, or fixed in place in a single large chamber using suitable supports and separators if desired. The catalyst bed so prepared may be regenerated in situ when necessary without disarranging or mixing the increments containing different proportions of catalyst and heat capacity material.

The embodiment illustrated in Figure 1 can be readily applied to conversion processes, employing endothermic conversion and exothermic catalyst reactivation periods of relatively short duration, which do not involve means for supply of supplemental heat within the reaction zone. In such operations, process efficiency is greatly improved by utilization of the heat evolved during reactivation as a means to supply heat to the contact masses of the catalyst bed, thus providing a source of endothermic heat for hydrocarbon conversion. The available heat released from the catalyst bed when operated in this manner is a significant fraction of the total heat input to the catalyst bed, and consequently close control and rapid adjustment of catalyst temperatures throughout the operating cycle are greatly facilitated.

In conversions of this type having a conversion period and a catalyst reactivation period it is the normal practice to pass hydrocarbon fluids preheated to a suitable temperature through a catalyst bed at approximately the same temperature, and to regulate pressure, space, velocity, reactant concentration and other reaction variables to conform to desired conversion and process yields. The conversion period is terminated at some economically selected degree of catalyst deactivation, and reactivation is then commenced and accomplished by combustion of carbonaceous deposits in the catalyst bed formed by decomposition during the conversion of the hydrocarbons. Temperature must be closely controlled in the endothermic conversion period because of the magnitude of the decrease in reaction rate caused by a temperature drop of only a few degrees. In the reactivation period, since highly exothermic reactions at elevated temperatures are involved it is essential to maintain temperatures within a range which will permit substantially complete restoration of activity without permanent damage to the catalyst. By the arrangement of heat capacity material in the manner illustrated, the desirability for close regulation of temperature during both the conversion and reactivation period is realized.

In the application of this invention to the conversion period, the preheated hydrocarbon fluid entering the catalyst bed undergoes conversion and as a result the fluid temperature tends to fall to a value corresponding to the amount of endothermic heat absorbed. With high heat capacity in said inlet section, the release of heat to the fluid at least partially offsets the abstraction of heat by the reactions occurring so that (A) the hydrocarbon fluid temperature is maintained at a higher average value while passing through the remainder of the catalyst bed, (B) the inlet section is maintained at a higher average temperature and (C) conversion is at a higher average level during the entire conversion period.

In the reactivation period of a process employing high heat capacity material in accordance with the present invention, oxygen-containing gas is passed through the catalyst bed at a temperature high enough to initiate and maintain combustion of the carbonaceous deposits. The gas temperature is raised by the combustion reactions to a degree determined in part by the transfer of heat from the catalyst surface to the gas stream. By conducting the reactivation (as illustrated in Figure 1) with the reaction gas passing first through the sections of lower heat capacity and then through the sections of higher heat capacity, a greater proportion of the heat liberated is absorbed in the section of high heat capacity. Furthermore, at the completion of reactivation the section of high heat capacity is often at a temperature suitable for the resumption of conversion without further adjustment. If adjustment of the temperature is required, the maximum quantity of heat is nevertheless available in the hydrocarbon inlet section (high heat capacity section) for the subsequent conversion period. Should reactivation be carried out with gas flow in the same direction as in the conversion period, the inlet section of high heat capacity would be cooled to the inlet temperature of the reactivation gas with consequent overheating of the lower (outlet section) and a greatly reduced retention of heat for the conversion period.

The embodiment illustrated in Figure 2 represents the application of the invention to a different type of process wherein indirect heat transfer means may be used to supply heat into the catalyst bed during the conversion period and/or away from the catalyst during reactivation. In this diagrammatic drawing the substance having the high heat capacity is divided into a plurality of sections from top to bottom with gas inlets interposed at appropriate intervals for the introduction of heating or cooling gas for the readjustment of the gas stream temperature at different stages within the catalyst bed. This specific arrangement is of particular advantage during reactivation since it enables substantially simultaneous reactivation of the entire catalyst bed by control of gas temperature and oxygen content.

In the operation of the apparatus illustrated in Figure 2, the preheated hydrocarbon fluid passes through the entire bed from top to bottom during the conversion period. The catalyst bed contains active contact material and high heat capacity material so proportioned in a plurality of sections as to produce a successively decreasing heat capacity from top to bottom of the bed. Each section may be either of uniform heat capacity material composition or of decreasing composition but each successive section has less heat capacity material than the preceding section. In this particular diagram the gas inlets are so placed that the sections of the catalyst bed between the inlets increase in total volume in the same direction in order to maintain relatively constant space velocity when heat carrier gas is injected at the side during the conversion period. Also the effective catalyst activity increases in the direction of hydrocarbon flow.

In the reactivation period, oxygen-containing gas at a temperature high enough to initiate and support combustion may enter at the top and pass through the entire bed. However, the temperature and oxygen content of this gas stream may be readjusted at the entrance to each section between the gas inlets by permitting hot regenerating gas or hot air to enter as indicated in Figure 2, through the inlets enabling reactivation of the entire catalyst bed in parallel instead of in series. The inlet portion of the catalyst bed and each section whether of a uniform or variable heat capacity material composition is, therefore, able to retain heat in proportion to its heat capacity and the quantity of carbon deposited therein. Extraordinary flexibility of operation is achieved, and the final temperature of the entire bed for its full length at the end of reactivation may be closely controlled by control of the temperature, and composition of the entering gas streams at the various points of introduction.

As an alternative to the above method of reactivation is shown in Figure 3. The regenerating gas containing free oxygen may enter the reaction chamber at the bottom and flow upward through the catalyst bed in the reverse direction to the flow of hydrocarbons during the conversion period. The temperature of the regenerating gas increases as the gas flows through the catalyst bed which results in the sections of higher heat capacity adsorbing a greater proportion of the heat liberated during reactivation of the catalyst than the sections of lower heat capacity. The regenerating gas may enter as well through the side inlets in order to regenerate the catalyst bed sections between the inlets in parallel. By regenerating the sections of the catalyst bed in parallel any danger of overheating any portion of the bed would be substantially decreased.

In both embodiments of Figures 1, 2 and 3 the arrangement of the present invention adjusts the heat capacity of the catalyst bed to conform to the potential heat released in reactivation. This effect results from the fact that maximum carbon deposition is ordinarily noted in the portion of the catalyst bed first contacted by the hydrocarbon fluid. This pattern of carbon deposition is the result of the reactants or hydrocarbon feed being at the maximum temperature at the entrance to the catalyst bed, and the conversion as measured by endothermic heat absorption also being at a maximum. Retention of this heat released in reactivation enables maintenance of a uniform temperature pattern in the catalyst bed because hot zones do not migrate in the direction of reactivating gas flow and the average temperature gradient for the endothermic conversion conforms to the desired limiting values for efficient conversion. These effects are important in improving process yields and conversion efficiency.

As previously indicated, with maximum heat retention in the indicated catalyst bed zones, heat transfer from the catalyst bed to the hydrocarbon fluid occurs to the greatest extent in portions of the bed where the conversion reactions are initially at the highest level and thus where endothermic heat requirements are a maximum. A partial replacement of heat abstracted at these points produces higher fluid temperatures in portions of the bed subsequently traversed by the fluid hydrocarbon reactants and conversion products. This heat input together with increased catalyst activity achieved by the catalyst bed composition is essential to maintenance of conversion rate in view of lower reactant concentrations and the downward temperature gradient in sections of the bed adjacent to the fluid outlet.

As the catalyst becomes deactivated, the zones of maximum conversion may move through the bed in the direction of hydrocarbon flow. This secondary effect is also aided by the present catalyst and heat capacity material arrangement since higher average catalyst temperatures are obtained during the entire process period.

While the heat capacity of the catalyst bed is shown to be substantially lower in the sections of the bed adjacent to the hydrocarbon outlet, said outlet sections may, and often do, contain controlled amounts of heat retaining material. Thus, it may be advantageous to incorporate material of high heat capacity throughout the entire bed, without, however, departing from the above described gradation of two heat capacity materials, at least one having catalytic activity.

The invention may be applied as well to exothermic reactions as to endothermic reactions. For exothermic processes the high heat capacity material is located in the portion of the bed where the greatest exothermic heat is released. Upon the release of the exothermic heat, the high heat capacity material adsorbs the heat thus preventing a high temperature rise and local overheating. After the completion of the conversion period, the catalyst bed must be cooled to dissipate the stored up heat and make ready for another conversion period. In the usual application to exothermic processes the greatest exothermic heat is released at the inlet to the catalyst bed, and, therefore, the high heat capacity material should be present in the greatest quantity at the inlet. The arrangement of heat capacity materials is therefore similar to that arrangement used for endothermic processes.

In general, the present invention is applicable to many types of endothermic and exothermic processes, in particular the conversion of hydrocarbons, specifically those conversions include cracking, dehydrogenation, isomerization, polymerization, reforming, etc. This invention is particularly applicable to those endothermic hydrocarbon conversion processes which involve an exothermic reactivation of a catalyst in situ.

The catalyst compositions preferred for the practice of this invention may be obtained from various combinations of contact materials. The active catalysts are those known to have suitable promoting action in specific conversion reactions at the appropriate temperatures and pressures. In the case of catalytic cracking of petroleums and petroleum distillate fractions such as naphthas, kerosene, and gas oils, the catalysts generally used are acid treated clays, bauxite, and silica-alumina and the temperature is usually maintained within a range of about 850° F. to about 1150° F. For the catalytic alkylation of the isoparaffins such as isobutane and isopentane with the corresponding olefin hydrocarbons, the commonly used catalysts are chromic oxide, the alkali metals and alkali metal earths, aluminum chloride, etc. with or without promoters. Preferred alkylation temperatures are within the range of about 900° F. to about 1150° F.

The materials furnishing heat capacity may be those of inherently high heat capacity and/or those of moderate heat capacity and high density. In the latter instance, the desired heat-retaining capacity is achieved by virtue of the weight of materials included in a specific volume of the catalyst. Metal particles, shot, etc., fall in this category. Metals, however, should be chosen which do not have catalytic properties harmful to the hydrocarbon reactants. Under some conditions iron or nickel particles may be used, for example. Preferred materials include various metal oxides such as Alfrax ($Al_2O_3$), Carborundum (silicon carbide), quartz, high density zirconia ($ZrO_2$) and others of suitable properties often relating to density rather than to any particular chemical composition and often having some beneficial catalytic activity which contributes to the conversion reactions.

Specific examples of the application of the invention are shown below in the operation of two typical hydrocarbon converison processes.

The relative proportion of catalyst and high heat capacity material used in various portions of the zone will, of course, depend on a number of factors, such as rate and extent of reaction, the densities and specific heats of the materials to be used, the nature of the reaction itself and the length of process cycle. In each case the materials to be used and proportions thereof would be determined considering such conditions. In general the high heat capacity zone will comprise from 25–75% of its volume as high heat capacity material, this proportion progressively declining to the low heat capacity zone which may contain from 0–50% of said high heat capacity material.

*Example I*

A gas-oil cracking operation was carried out without application of indirect or supplementary heat, using silica-alumina gel-type catalyst of relatively low heat capacity. With the catalyst in a chamber similar to the diagram of Figure 1, two operations were performed, one with and one without the application of the present invention: (1) silica-alumina catalyst throughout the catalyst bed and (2) a 50–50 mixture of silica-alumina with Alfrax starting at the inlet (top) zone gradually changing to undiluted catalyst in the outlet (bottom) zone. With an inlet vapor temperature of 1125° F. in each case, typical curves for the average catalyst temperature during the conversion period are shown in Figure 4. The higher average temperature obtained with the heat capacity material operation (2), indicates a marked degree of improvement in conversion during the conversion period by the application of the present invention. It was also noticed that the temperature was more uniform throughout the catalyst bed and that the yield of cracked products was increased appreciably.

*Example II*

Figure 5:
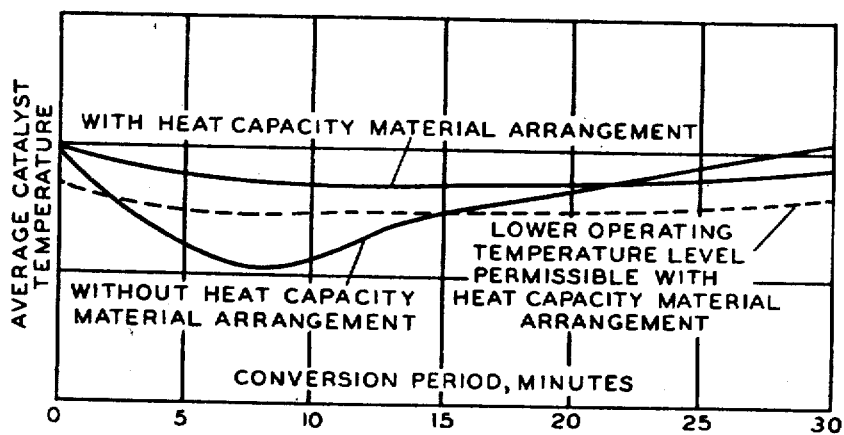

N-butane was dehydrogenated over chromia-alumina catalyst in accordance with the present example. The operation involves apparatus similar to that of Figure 2, with side injection of cooling gas during reactivation but no injection of a heating medium during conversion. Two operations were carried out, (1) undiluted chromia-alumina catalyst in all sections of the bed and (2) applying the principles of the present invention by the incorporation of decreasing proportions of 27 chrome-iron alloy shot in the sections of the bed, ranging from about 10 volume per cent in the top to one per cent in the bottom section. The average temperature through the catalyst case is shown in Figure 5, plotted against the duration of the conversion period. The solid lines indicate average bed temperatures with an inlet hydrocarbon vapor temperature of about 1090° F. The curve for average temperatures with heat capacity material incorporated with the catalyst operation (2) is substantially higher than operation (1) without the graduation of alloy shot, except at the end of the period when catalyst deactivation is well advanced. This condition indicates the extent to which conversion processes may be improved by the present invention. Substantially increased yield of products was achieved by the practice of this invention in the second operation above.

The dotted line of Figure 4 illustrates an important manner for utilizing the benefits of the present process. Since the average temperature is maintained at a higher level by incorporation of heat capacity material, the inlet temperature may be reduced to a lower level as shown and the selectivity of conversion increased without loss of total yield in the conversion period. This improvement in process efficiency may be in some cases more desirable than increased conversion at the higher levels obtainable by the present invention.

In the curves shown in Figures 4 and 5 each scale unit on the vertical ordinates represents a temperature difference of 50° F. but to conserve space only the upper portion of the scale is shown.

Although the invention has been described with particular reference to specific type conversions carried in a particular manner, various modifications will occur to one skilled in the art which may be practiced without departing from the scope of the invention.

I claim:

1. The method of effecting endothermic chemical reactions in a catalyst bed, which comprises preheating a catalyst bed containing a suitably active catalyst of relatively low heat capacity admixed with a relatively high heat capacity material arranged in successive increments of progressively decreasing proportions of said high heat capacity material whereby the heat retained by each increment of said catalyst bed after said preheating corresponds substantially to the quantity of heat potentially required from each increment in effecting said endothermic chemical reactions, and subsequently passing reactants under endothermic reaction conditions through said preheated catalyst bed in the direction of decreasing proportions of said high heat capacity material wherein a substantial portion of the heat of reaction is supplied by the release of heat from the high heat capacity material in said catalyst bed, in proportion to the heat required to compensate for the endothermic temperature loss in each increment of the bed in the direction of flow of reactant.

2. In a process for the endothermic conversion of hydrocarbons in the presence of a catalyst upon which carbonaceous materials are deposited during an endothermic conversion period and from which said carbonaceous materials are removed by combustion during an exothermic catalyst reactivation period, the improvement which comprises passing hydrocarbons during said endothermic conversion period through a catalyst bed containing active catalyst of relatively low heat capacity admixed with a relatively high heat capacity material arranged in successive increments of progressively decreasing proportions of said high heat capacity material in the direction of passage of said hydrocarbons whereby heat retained by each increment of said catalyst bed during the previous exothermic catalyst reactivation period corresponds substantially to the quantity of heat potentially required by that increment in effecting said conversion of hydrocarbons, and during said exothermic catalyst reactivation period passing reactivation gas containing free oxygen through said catalyst bed to remove carbonaceous materials by combustion thereof whereby heat of combustion is retained by said increments in proportion to the amount of high heat capacity material present in each increment.

3. In a process for the endothermic conversion of hydrocarbons in the presence of a catalyst upon which carbonaceous materials are deposited during an endothermic conversion period and from which said carbonaceous materials are removed by combustion during an exothermic catalyst reactivation period, the improvement which comprises passing hydrocarbons during said endothermic conversion period through a catalyst bed containing active catalyst of relatively low heat capacity admixed with a relatively high heat capacity material arranged in successive increments of progressively decreasing proportions of said high heat capacity material in the direction of passage of said hydrocarbons whereby heat retained by each increment of said catalyst bed during the previous exothermic catalyst reactivation period corresponds substantially to the quantity of heat potentially required by that increment in effecting said conversion of hydrocarbons, and during said exothermic catalyst reactivation period introducing reactivation gas containing free oxygen between a plurality of increments of said catalyst bed to remove carbonaceous materials by combustion thereof whereby heat of combustion is retained by each of said increments in proportion to the relative amounts of high heat capacity material present in said increments.

4. In a process for the endothermic conversion of hydrocarbons in the presence of a catalyst upon which carbonaceous materials are deposited during an endothermic conversion period and from which said carbonaceous materials are removed by combustion during an exothermic catalyst reactivation period, the improvement which comprises passing hydrocarbons during said endothermic conversion period through a catalyst bed containing active catalyst of relatively low heat capacity admixed with a relatively high heat capacity material arranged in successive increments of progressively decreasing proportions of said high heat capacity material in the direction of passage of said hydrocarbons whereby heat retained by each increment of said catalyst bed during the previous exothermic catalyst reactivation period corresponds substantially to the quantity of heat potentially required by that increment in effecting said conversion of hydrocarbons, and during said exothermic catalyst reactivation period passing reactivation gas containing free oxygen through said catalyst bed in the direction of increasing proportions of said high heat capacity material and opposite to the direction of flow of hydrocarbons during conversion whereby heat is retained by each of said increments of said catalyst bed in increasing proportions in the direction of flow of reactivation gas.

5. In a process for the endothermic conversion of hydrocarbons in the presence of a catalyst upon which carbonaceous materials are deposited during an endothermic conversion period and from which said carbonaceous materials are removed by combustion during an exothermic catalyst reactivation period, the improvement which comprises passing hydrocarbons during said endothermic conversion period through a catalyst bed containing active catalyst of relatively low heat capacity admixed with a relatively high heat capacity material arranged in successive increments of progressively decreasing proportions of said high heat capacity material in the direction of passage of said hydrocarbons whereby heat retained by each increment of said catalyst bed during the previous exothermic catalyst reactivation period corresponds substantially to the quantity of heat potentially required by that increment in effecting said conversion of hydrocarbons, and during said exothermic catalyst reactivation period introducing reactivation gas containing free oxygen between a plurality of increments of said catalyst bed and passing said reactivation gas through said catalyst bed in the direction of increasing proportions of said high heat capacity material whereby heat is retained by each of said increments of said catalyst bed in increasing proportion in the direction of flow of reactivation gas.

6. In a process for the cracking of hydrocarbons effected at a temperature between about 850° F. and about 1150° F. in the presence of a catalyst upon which carbonaceous materials are deposited during a conversion period and from which said carbonaceous materials are removed by combustion during a catalyst reactivation period, the improvement which comprises forming a catalyst bed by admixing an active catalyst of relatively low heat capacity with a relatively high heat capacity material arranged such that said high heat capacity material is present in said catalyst bed in successive increments of progressively decreasing proportions whereby the heat capacity of each increment of said catalyst bed corresponds substantially to the quantity of heat potentiality transferable to that increment during said catalyst reactivation period, supplying heat to said catalyst bed during said catalyst reactivation period, by passing a reactivation gas containing free oxygen through said catalyst bed in the direction of increasing proportions of said high heat capacity material to combust said carbonaceous materials deposited on the catalyst during said conversion period and subsequently during said conversion period passing hydrocarbons under cracking conditions in the direction of decreasing proportions of said high heat capacity material through said catalyst bed in a direction opposite to the flow of reactivation gas wherein a substantial portion of the heat of conversion is supplied by the liberation of available heat from said catalyst bed.

WALTER A. SCHULZE.

REFERENCES CITED

The following references are of record in the file of this patent:

UNITED STATES PATENTS

| Number | Name | Date |
|---|---|---|
| 2,142,678 | Porter | Jan. 3, 1939 |
| 2,161,677 | Houdry | June 6, 1939 |
| 2,244,612 | Crowley | June 3, 1941 |
| 2,290,845 | Voorhees | July 21, 1942 |
| 2,300,971 | Roberts et al. | Nov. 3, 1942 |
| 2,303,076 | Frolich | Nov. 24, 1942 |
| 2,312,006 | Thiele | Feb. 23, 1943 |
| 2,331,427 | Schulze et al. | Oct. 12, 1943 |
| 2,371,181 | Newton | Mar. 13, 1945 |
| 2,382,371 | Utterback | Aug. 14, 1945 |

Certificate of Correction

Patent No. 2,423,907. July 15, 1947.

WALTER A. SCHULZE

It is hereby certified that errors appear in the printed specification of the above numbered patent requiring correction as follows: Column 8, line 10, for "converison" read *conversion*; column 12, line 1, for "potentiality" read *potentially*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.* heat capacity admixed with a relatively high heat capacity material arranged in successive increments of progressively decreasing proportions of said high heat capacity material in the direction of passage of said hydrocarbons whereby heat retained by each increment of said catalyst bed during the previous exothermic catalyst reactivation period corresponds substantially to the quantity of heat potentially required by that increment in effecting said conversion of hydrocarbons, and during said exothermic catalyst reactivation period introducing reactivation gas containing free oxygen between a plurality of increments of said catalyst bed and passing said reactivation gas through said catalyst bed in the direction of increasing proportions of said high heat capacity material whereby heat is retained by each of said increments of said catalyst bed in increasing proportion in the direction of flow of reactivation gas.

6. In a process for the cracking of hydrocarbons effected at a temperature between about 850° F. and about 1150° F. in the presence of a catalyst upon which carbonaceous materials are deposited during a conversion period and from which said carbonaceous materials are removed by combustion during a catalyst reactivation period, the improvement which comprises forming a catalyst bed by admixing an active catalyst of relatively low heat capacity with a relatively high heat capacity material arranged such that said high heat capacity material is present in said catalyst bed in successive increments of progressively decreasing proportions whereby the heat capacity of each increment of said catalyst bed corresponds substantially to the quantity of heat potentiality transferable to that increment during said catalyst reactivation period, supplying heat to said catalyst bed during said catalyst reactivation period, by passing a reactivation gas containing free oxygen through said catalyst bed in the direction of increasing proportions of said high heat capacity material to combust said carbonaceous materials deposited on the catalyst during said conversion period and subsequently during said conversion period passing hydrocarbons under cracking conditions in the direction of decreasing proportions of said high heat capacity material through said catalyst bed in a direction opposite to the flow of reactivation gas wherein a substantial portion of the heat of conversion is supplied by the liberation of available heat from said catalyst bed.

WALTER A. SCHULZE.

REFERENCES CITED

The following references are of record in the file of this patent:

UNITED STATES PATENTS

| Number | Name | Date |
| --- | --- | --- |
| 2,142,678 | Porter | Jan. 3, 1939 |
| 2,161,677 | Houdry | June 6, 1939 |
| 2,244,612 | Crowley | June 3, 1941 |
| 2,290,845 | Voorhees | July 21, 1942 |
| 2,300,971 | Roberts et al. | Nov. 3, 1942 |
| 2,303,076 | Frolich | Nov. 24, 1942 |
| 2,312,006 | Thiele | Feb. 23, 1943 |
| 2,331,427 | Schulze et al. | Oct. 12, 1943 |
| 2,371,181 | Newton | Mar. 13, 1945 |
| 2,382,371 | Utterback | Aug. 14, 1945 |

---

Certificate of Correction

Patent No. 2,423,907. July 15, 1947.

WALTER A. SCHULZE

It is hereby certified that errors appear in the printed specification of the above numbered patent requiring correction as follows: Column 8, line 10, for "converison" read *conversion*; column 12, line 1, for "potentiality" read *potentially*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.*